United States Patent [19]

Czajka et al.

[11] 4,066,593

[45] Jan. 3, 1978

[54] WATER SOLUBLE WIRE ENAMELS

[75] Inventors: Thomas S. Czajka, Wheaton; Richard P. Needham, Woodridge, both of Ill.

[73] Assignee: Standard Oil Company (Indiana), Chicago, Ill.

[21] Appl. No.: 625,192

[22] Filed: Oct. 23, 1975

[51] Int. Cl.$^2$ .................. C08L 67/00; C08L 79/08
[52] U.S. Cl. .................. 260/29.2 E; 260/29.2 N; 260/75 N
[58] Field of Search ........... 260/29.2 N, 78 TF, 75 N, 260/29.2 E

[56] References Cited

U.S. PATENT DOCUMENTS

| 3,518,219 | 6/1970 | Lavin et al. | 260/29.2 N |
| 3,555,113 | 1/1971 | Sattler | 260/78 TF |
| 3,780,133 | 12/1973 | Kolyer et al. | 260/78 TF |
| 3,925,313 | 12/1975 | Kojima et al. | 260/29.2 N |
| 3,936,404 | 2/1976 | Ishizuka et al. | 260/29.2 N |
| 3,944,706 | 3/1976 | Czajka | 260/78 TF |

FOREIGN PATENT DOCUMENTS

| 1,036,426 | 8/1958 | Germany | 260/29.2 N |

*Primary Examiner*—Allan Lieberman
*Attorney, Agent, or Firm*—Gregory E. Croft; Arthur G. Gilkes; William T. McClain

[57] ABSTRACT

A water soluble wire enamel having a Class F thermal rating is the reaction product of several ingredients comprising a water soluble polyester resin based on terephthalic acid and trimellitic anhydride, an ethanol-substituted amine, water, and a suitable crosslinking agent.

5 Claims, No Drawings

WATER SOLUBLE WIRE ENAMELS

BACKGROUND OF THE INVENTION

1. Field of the Invention

This invention relates to water soluble enamel compositions. More particularly, it relates to water soluble wire enamels which have high thermal stability.

2. Description of the Prior Art

A large percentage of the wire enamels commercially produced today are solvent-based systems, utilizing such solvents as cresylic acids, xylene, and other hydrocarbons. Examples of these types of enamels are shown in U.S. Pat. No. 3,555,113. During the wire coating process these solvents are not recovered and must be incinerated to meet pollution regulations. This is generally accomplished by mounting flame burners on the top of the enameling equipment, which involves considerable extra expense resulting from maintenance and operation of the incinerators and total loss of solvent.

These problems make water soluble wire enamels very attractive since they offer no pollution problems and avoid the associated expenses. However, until now a major drawback of water soluble enamels has been their low thermal ratings. The only water soluble wire enamels available today are not polyester enamels and only have Class A (105° C.) thermal ratings. This is insufficient for many wire coating applications which require greater thermal stability at higher temperatures.

Accordingly, it is an object of the invention to develop a water soluble wire enamel having a Class F (155° C.) thermal rating. This and other objects will become apparent upon further reading of the specification.

SUMMARY OF THE INVENTION

Broadly, the invention resides in a water soluble wire enamel having a Class F thermal rating. The enamel is the reaction product of several ingredients comprising from 45 to 55 weight percent of a water soluble polyester resin in an ether glycol solution, from 3 to 5 weight percent of an ethanol-substituted amine, such as dimethylethanol amine, diethanol amine, and triethanol amine, from 35 to 50 weight percent water, and from 1 to 2.5 weight percent of a suitable crosslinking agent. The water soluble polyester resin is itself the reaction product of several ingredients comprising from 25 to 35 weight percent terephthalic acid, from 5 to 15 weight percent trimellitic anhydride, from 5 to 15 weight percent adipic acid, from 25 to 35 weight percent neopentyl glycol, and from 5 to 10 weight percent tris 2-hydroxyethyl isocyanurate. The polyester resin is diluted to a 60 to 80 weight percent solution in an ether glycol before being reacted with the other ingredients to form the final water soluble wire enamel.

More specifically, the invention resides in the abovesaid water soluble wire enamel wherein the polyester resin further comprises from 3 to 8 weight percent propylene glycol.

DESCRIPTION OF THE PREFERRED EMBODIMENT

A Class F rating for wire enamels requires that the enamel have a thermal endurance value of 155° C., as determined by ASTM D2307-68, and a heat shock value of 175° C. or higher. Heat shock is a measure of the ability of the enamel film to withstand heat while in a stressed condition such as is found in heated wound magnet wire coils. A length of enameled wire is elongated 20% and wrapped around a mandrel having a diameter three times the diameter of the wire. Each one of a series of samples is placed in an oven for ½ hour at various temperatures. The highest temperature which the stressed coils withstand after being heated for ½ hour and cooled to room temperature without visual failures occurring in the enamel film is considered the heat shock value.

This invention describes a resin which meets both of these criteria.

WATER SOLUBLE POLYESTER RESIN PREPARATION

The formulation for the preferred polyester resin has the following ingredients:

| Material | lbs. | Weight Percent |
| --- | --- | --- |
| Terephthalic acid | 120.4 | 30.9 |
| Trimellitic anhydride | 41.8 | 10.7 |
| Adipic acid | 53.0 | 13.6 |
| Neopentyl glycol | 125.2 | 32.1 |
| Propylene glycol | 18.9 | 4.9 |
| Tris 2-hydroxyethyl isocyanurate (THEIC) | 30.5 | 7.8 |

The polyester resin was prepared batchwise in two stages utilizing a kettle equipped with a partial condenser and a total condenser. In the first stage the neopentyl glycol and propylene glycol were charged to the kettle first and heated to 280° F. while sparging with nitrogen at a rate of 0.2 SCFM. At 280° F. the adipic acid and THEIC were added, followed by slow addition of the terephthalic acid with full agitation to maintain a slurry. The sparge rate was increased to 0.3 SCFM and the kettle temperature raised to 400° F. over a period of several hours. The first water off was recorded and every hour thereafter a cumulative refractive index was run on the distillate. Based on the refractive index, acid numbers were run beginning when 80% of the theoretical water had been distilled off. At an acid number of 15 the resin was cooled to 370° F. and makeup propylene glycol was added to replace the amount lost through the condenser. The resin was then reheated up to 450° F. and held for a clear resin sample and an acid number of less than 10. The kettle was then cooled to 350° F. The resin at the end of this first stage had an acid number (solids) of 7.35 and a Gardner color less than 1.

In the second stage, with the resin at 350° F., the trimellitic anhydride was added and the kettle contents reheated to 350°–360° F. The contents were held at this temperature until an acid number of 65–68 was reached, at which point the temperature was lowered to 340° F. The resin was then thinned with diethylene glycol to 69% solids. The resin at the end of this second stage had an acid number (solids) of 67.0, a viscosity (Gardner-Holdt at 69% nonvolatile material) of $Z_6+$, and a Gardner color less than 1.

WATER SOLUBLE WIRE ENAMEL PREPARATION

The formulation for the preferred water soluble wire enamel has the following ingredients:

| Material | Weight (grams) | Weight Percent |
| --- | --- | --- |
| Polyester Resin (69% solids in diethylene | | |

-continued

| Material | Weight (grams) | Weight Percent |
|---|---|---|
| glycol) | 1600 | 52.3 |
| Dimethylethanol amine | 112 | 3.7 |
| Water | 1272 | 41.8 |
| Tyzor TE | 55.2 | 1.8 |
| BYK-301 | 0.55 | 0.02 |

The wire enamel was prepared by first preparing a slurry of the polyester resin in diethylene glycol having a solids content of 69 weight percent. The slurry was solubilized with dimethylethanol amine and reduced to 37 weight percent solids by adding water. The cross-linking agent, Tyzor TE, was added at an amount equal to 5 weight percent based on the polyester solids. (Tyzor TE is an organic titanate crosslinking agent sold by duPont having an 80 weight percent solution of triethanolamine titanate in isopropanol.) The mixture was thoroughly mixed and the pH adjusted to 8.5 with additional dimethylethanol amine. Finally, a flow additive, BYK-301, was added at a level of 0.05 weight percent based on the polyester solids. (BYK-301 is a silicone resin flow additive sold by Byck Mallinckrodt Chemical). After most of the resulting foam was broken out, the product was filtered with 5 micron paper. The final product had an acid number (solids) of 67.0; 69 wt. percent non-volatile material (N.V.M.); 31 wt. percent diethylene glycol; a Gardner-Holdt viscosity at 69% N.V.M. of $Z_6+$; and a Gardner color at 69% N.V.M. of 1. Some of the properties obtained from on-wire testing of the water soluble enamel are summarized in TABLE I.

It will be obvious to those skilled in the art that variations from the formulation shown for purposes of illustration may be made without departing from the scope of this invention.

TABLE I

| | ON-WIRE PROPERTIES | | | | | | | | |
|---|---|---|---|---|---|---|---|---|---|
| | Oven Temperature | | | | | | Dielec- | | |
| Wire Speed, fpm | Top Zone ° F. | Bottom Zone, ° F. | Build, mil | 20% Jerk | Snap | Burnout, Sec. | tric Strength KVPM | Scrape, grams | Heat Shock |
| 30 | 800 | 450 | 3.2 | 1x | 1x | 429 | 1.0 | 790 | 200° C. |
| 40 | 800 | 450 | 3.2 | 1x | 1x | 429 | 1.8 | 840 | 200° C. |
| 40 | 800 | 400 | 3.2 | 1x | 1x | 501 | 2.2 | 910 | 200° C. |

We claim:

1. A water soluble wire enamel having a Class F thermal rating which is the reaction product of the ingredients comprising:

a. from 45 to 55 weight percent of a water soluble polyester resin which is the reaction product of the ingredients comprising from 25 to 35 weight percent terephthalic acid, from 5 to 15 weight percent trimellitic anhydride, from 10 to 15 weight percent adipic acid, from 25 to 35 weight percent neopentyl glycol, and from 5 to 10 weight percent tris 2-hydroxyethyl isocyanurate, said polyester resin being in the form of a 60 to 80 weight percent solution in an ether glycol;

b. from 3 to 5 weight percent of an ethanol-substituted amine;

c. from 35 to 50 weight percent water; and d. from 1 to 2.5 weight percent of a triethanolamine titanate crosslinking agent.

2. The water soluble wire enamel of claim 1 wherein the polyester resin ingredients further comprise from 3 to 8 weight percent propylene glycol.

3. The water soluble wire enamel of claim 1 wherein the ether glycol is diethylene glycol.

4. The water soluble wire enamel of claim 1 wherein the ethanol-substituted amine is dimethylethanol amine.

5. A water soluble wire enamel having a Class F thermal rating which is the reaction product of the ingredients comprising:

a. about 52.3 weight percent of a water soluble polyester resin which is the reaction product of the ingredients comprising about 30.9 weight percent terephthalic acid, 10.7 weight percent trimellitic anhydride, 13.6 weight percent adipic acid, 32.1 weight percent neopentyl glycol, 4.9 weight percent propylene glycol, and 7.8 weight percent tris 2-hydroxyethyl isocyanurate, said polyester resin ingredient being diluted to a 69 weight percent solution in diethylene glycol;

b. about 3.7 weight percent dimethylethanol amine;

c. about 41.8 weight percent water; and d. about 1.8 weight percent of an 80 weight percent solution of triethanolamine titanate in isopropanol.

* * * * *